(12) United States Patent
Xiong et al.

(10) Patent No.: US 8,737,217 B2
(45) Date of Patent: May 27, 2014

(54) SYSTEMS AND METHODS FOR DYNAMIC QUALITY OF SERVICE

(75) Inventors: Bo Xiong, Sunnyvale, CA (US); Dean Chang, Sunnyvale, CA (US)

(73) Assignee: Actiontec Electronics, Inc., Sunnyvale, CA (US)

( * ) Notice: Subject to any disclaimer, the term of this patent is extended or adjusted under 35 U.S.C. 154(b) by 13 days.

(21) Appl. No.: 13/486,817

(22) Filed: Jun. 1, 2012

(65) Prior Publication Data

US 2013/0028087 A1 Jan. 31, 2013

Related U.S. Application Data

(60) Division of application No. 11/805,604, filed on May 24, 2007, now Pat. No. 8,194,657, which is a continuation-in-part of application No. 11/805,471, filed on May 22, 2007, now abandoned.

(51) Int. Cl.
 *H04L 12/26* (2006.01)
 *H04J 3/16* (2006.01)
 *G06F 15/173* (2006.01)

(52) U.S. Cl.
 USPC .......................... 370/232; 370/468; 709/226

(58) Field of Classification Search
 CPC combination set(s) only.
 See application file for complete search history.

(56) References Cited

U.S. PATENT DOCUMENTS

| | | | |
|---|---|---|---|
| 7,209,437 B1 | 4/2007 | Hodgkinson et al. | |
| 7,209,440 B1 | 4/2007 | Walsh et al. | |
| 7,209,458 B2 | 4/2007 | Ahvonen et al. | |
| 7,734,738 B2 | 6/2010 | Daniel et al. | |
| 7,948,883 B1 | 5/2011 | Croft et al. | |
| 8,280,009 B2 | 10/2012 | Stepanian | |
| 8,488,461 B2 * | 7/2013 | Pan et al. | 370/232 |
| 2001/0052083 A1 | 12/2001 | Willins et al. | |
| 2002/0064149 A1 | 5/2002 | Elliott et al. | |
| 2002/0080786 A1 | 6/2002 | Roberts | |
| 2003/0081613 A1 | 5/2003 | Yamanaka | |

(Continued)

FOREIGN PATENT DOCUMENTS

| | | |
|---|---|---|
| WO | WO-2008/153740 A1 | 12/2008 |
| WO | WO-2010/148732 A1 | 12/2010 |

OTHER PUBLICATIONS

International Search Report and Written Opinion dated Oct. 23, 2008 for PCT/US2008/006568.

(Continued)

*Primary Examiner* — Clemence Han
(74) *Attorney, Agent, or Firm* — Foley & Lardner LLP; Christopher C. Bolten; Nicola A. Pisano

(57) ABSTRACT

Systems, methods, and apparatus for routing are provided in which a connection track comprising a plurality of network or transport layer packets, received by a router, is identified by examining header fields of one or more packets in the plurality of packets. One or more quality of service (QoS) parameters is associated with the connection track by determining whether the track encodes a data type by (i) an identification of a predetermined application protocol used within the one or more packets and/or (ii) a comparison of a payload of one or more packets in the plurality of packets to known data type formats. A first QoS parameter is set to a first value in a first value range when the connection track contains the first data type. The connection track is routed through the router in accordance with the one or more QoS parameters assigned to the connection track.

16 Claims, 3 Drawing Sheets

(56) References Cited

U.S. PATENT DOCUMENTS

| | | |
|---|---|---|
| 2003/0126272 A1 | 7/2003 | Corl et al. |
| 2004/0062267 A1 | 4/2004 | Minami et al. |
| 2006/0018323 A1 | 1/2006 | Kempe |
| 2007/0201473 A1 | 8/2007 | Bhatia et al. |
| 2007/0206617 A1 | 9/2007 | Andreasen et al. |
| 2007/0271590 A1 | 11/2007 | Gulas et al. |
| 2007/0297335 A1 | 12/2007 | Picher-Dempsey |
| 2008/0291916 A1 | 11/2008 | Xiong et al. |
| 2008/0313278 A1 | 12/2008 | Hochberg |
| 2010/0246509 A1 | 9/2010 | Chen |
| 2012/0179790 A1 | 7/2012 | Kim et al. |

OTHER PUBLICATIONS

Mahajan, et al., "Controlling High-Bandwidth Flows at the Congested Router," Proc. ACM 9th International Conference on Network Protocols (ICNP), (2001).

Talukder, et al., "QoSIP: A QoS Aware IP Routing Protocol for Multimedia Data," Advanced Communication Technology, 8th International Conference, (2006), 618-623.

TCP/IP Ports, accessed May 9, 2007, www.chebucto.ns.ca/~rakerman/port-table.html: 1-16.

\* cited by examiner

SYSTEMS AND METHODS FOR DYNAMIC QUALITY OF SERVICE

CROSS REFERENCE TO RELATED APPLICATIONS

This application is a divisional under 35 U.S.C. §121 of U.S. patent application Ser. No. 11/805,604, filed May 24, 2007 and entitled "Systems and Methods for Dynamic Quality of Service," which is a continuation-in-part of U.S. patent application Ser. No. 11/805,471, abandoned, filed May 22, 2007 and entitled "Systems and Methods for Dynamic Quality of Service," the entire contents of both of which are incorporated by reference herein.

FIELD OF THE INVENTION

The present invention relates to systems and methods for dynamic QoS routing where a connection track comprising data is routed from source to destination by a router path that satisfies the QoS (e.g., bandwidth and delay) requirements of the connection track.

BACKGROUND OF THE INVENTION

Many IP routers typically support only "best effort" traffic. However, the bandwidth available to people has been increasing rapidly with the advent of broadband access. The result is that many new services are now desired that require better QoS than "best effort" IP can support. Also, with broadband, the problem of controlling the total usage and carrier expense has become important. Thus, it has become necessary to improve both the delay performance and the control of bandwidth for IP service, much as was accomplished in ATM. Also, call rejection for high bandwidth streaming services like video is required instead of random discards if quality is to be maintained.

Moreover, new quality of service (QoS) standards require that network devices, such as network switches, address these requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video.

If all paths within a network are fully loaded, some networks discard packets. Discarding correctly is an important component for achieving efficient QoS for data transmissions. Internet applications tend to quickly fill all of the buffers on a conventional network. Algorithms such as random early discards ("RED"), which are proportional to the buffer fill, can save the switch from becoming overloaded by such Internet applications, but unfortunately interferes with the QoS of such transmissions. In one example, for TCP, a conventional network cannot avoid discarding before the user is up to the available rate. For UDP, a conventional system cannot discard even though the stream is at an acceptable rate.

Several conventional protocols have been proposed to attempt to address existing QoS limitations in an IP network. One exemplary protocol, the resource reservation protocol ("RSVP"), is described within the Internet Engineering Task Force ("IETF")'s request for comments ("RFC") for "Resource ReSerVation Protocol (RSVP)—Version 1 Functional Specification" ("RFC 2205") and "Specification of Guaranteed Quality of Service" ("RFC 2212") was intended to allow a router flow to signal its requirements. However, the complexity and processing time involved with RSVP negotiation makes RSVP, by itself, unsatisfactory.

Another exemplary protocol, the differentiated Services ("DiffServ") protocol is an alternative technique to RSVP, which utilizes six DiffServ bits in the IP header to indicate one of several limited QoS classes. In particular, as discussed in the IETF's "Definition of the Differentiated Services Field (DS Field) in the IPv4 and IPv6 Headers" ("RFC 2474") and "An Architecture for Differentiated Services" ("RFC 2475"), DiffServ is intended to allow network service providers to offer to each network user a range of network services which are differentiated on the basis of performance. In such a scheme, by marking a specific field (e.g. the DS field) of each packet with a specific value, a user can request, on a packet by packet basis, a specific limited performance class level. This value would specify the per-hop behavior to be allotted to that packet within the provider's network.

Typically, the user and network provider would negotiate a policy (e.g. policing profile) that describes the rate at which traffic can be submitted at each service class level. Packets submitted in excess of this profile would not be allotted the service class level requested. An important feature of Diff-Serv is viewed to be its scalability, which allows the protocol to be deployed in very large networks. This scalability is achieved by forcing as much complexity out of the core of the network and into the boundary devices that process lower volumes of traffic and lesser numbers of flows. However, this protocol has significant limits that preclude DiffServ from providing an effective solution to the problems faced with implementing QoS in an IP network. For example, DiffServ is a traffic classification technique that only has six bits with a total of only thirteen general service classes defined. Four classes are reserved for assured service. One class is reserved for expedited service. There are, however, no QoS definitions to quantify each class, which thereby limits the QoS types that can be supported. Since the Internet will need to be able to carry a wide variety of QoS types, this quantification limitation greatly restricts the future use of DiffServ-based QoS in large networks. By oversimplifying the QoS characterization problem by relying upon simple non-quantified classes, the overall effectiveness of such QoS in IP has been minimized.

DiffServ in the IP context also does not allow each packet to be routed with state information associated with each packet. Only one route is allowed by the border gateway protocol ("BGP") and the routing protocols. DiffServ allows packets to be grouped by DiffServ classes and routed together as part of a composite flow. However, such composite flows may far exceed the routing path's capacity. In addition, multiple routes cannot be used because of packet ordering problems. With no state information and only DiffServ bits, the best that a conventional switch can do is to set up multiple queues, each receiving all of the packets of a specific QoS class. Within such a queue, there would be no way to avoid head-of-line blocking. Since the queues do not correspond to single micro-flows, weighted fair queuing ("WFQ") cannot achieve an improvement in such factors as delay variation.

The IETF has proposed an alternative conventional protocol, within RFC 2702, entitled "Requirements for Traffic Engineering Over Multi Protocol Label Switching ("MPLS")." MPLS utilizes a routing approach whereby the normal mode of operation is that the operator of the network explicitly sets up MPLS composite flows on a static basis across the network. Each MPLS composite flow also is manually assigned a QoS by the operator.

MPLS provides a simple "core" set of mechanisms which can be applied in several ways to provide a rich functionality.

Since MPLS defines an architecture and protocol for encapsulating IP traffic in new routing headers, it involves a much more extensive change to conventional IP networks than Diffserv which is exclusively focused on existing routing-independent IP packet fields. The MPLS approach to indicating IP QoS parameters is different from the approach defined in Diffserv. In particular, the MPLS label is intended to improve efficiency and control of the switch network and allow switches to forward packets using predetermined paths according to, among other things, specified QoS levels.

The disadvantage of MPLS, however, like DiffServ, is that the switch can only identify a small set of "standard" QoS patterns, thereby greatly restricting the future services available to a network that requires a wide variety of QoS types to be used. Furthermore, even though MPLS allows multiple composite flows on multiple routes, there still are restrictions on multiple paths. In addition, router micro-flows still must be grouped into composite flows. Therefore, like DiffServ, when a path becomes overloaded, there is no way to reject new micro-flows or to split the composite flow into micro-flows and use alternative routes. Instead, MPLS can only drop random packets.

Another drawback with known QoS systems is that they typically require manual intervention to set up and maintain. This can be a difficult and time consuming task. Given the above background, what is needed in the art are improved systems and methods for providing QoS that are more automated and easier to use.

SUMMARY OF INVENTION

The present invention overcomes the deficiencies in the prior art. One or more header fields of network layer or transport layer packets, received by a router, are examined and, based on the values found in the header fields, assigned to connection tracks. That is, those packets that are communicating the same message, such as a file, video, or audio, are assigned to the same connection track. Then, advantageously, the data type of the message carried by a connection track is determined and QoS parameters are assigned to the connection track based upon this data type. The connection track is then routed through the router in accordance with the one or more QoS parameters. This process provides the advantage of routing connection tracks based on message data type. This leads to improved router performance. Furthermore, this leads to improved control over the data being routed. For example, at times when the router is receiving too much data, the router can make intelligent decisions on which connection tracks to route and which connection tracks to drop. In one case, assume that the router can only route N streaming videos at any given time and still deliver the streaming video to endpoints in real time. If the router is receiving M connection tracks that each contain real-time streaming video, where M is greater than N, than the router can proactively drop M−N of the connection tracks in order to deliver the N connection tracks in real time to endpoints.

One aspect of the invention provides a routing method comprising identifying a connection track comprising a plurality of network layer or transport layer packets, received by a router, by examination of one or more header fields of one or more first packets in the plurality of network layer or transport layer packets. As used herein, the term "first packet" does not necessarily mean that such packets are the first packets to be received sequentially in time for a given connection track by a router. The term "first packet" merely serves to identify some or all of the packets in the plurality of packets that constitute a connection track. It will be appreciated that any subset of the packets in the plurality of packets that constitute a connection track can serve as the one or more first packets. It will also be appreciated that all of the packets in the plurality of packets in the connection track can serve as the one or more first packets. One or more quality of service (QoS) parameters are associated with the connection track by determining whether the connection track encodes a first data type. Exemplary methods by which the first data type can be determined comprise (i) an identification of a predetermined application protocol used within the one or more first packets and/or (ii) a comparison of a payload of one or more packets in the plurality of network layer or transport layer packets to one or more predetermined data type formats. A first QoS parameter in the one or more QoS parameters is set to a first value in a first value range when the connection track is determined to contain the first data type (e.g., the message encoded within the connection track is a first data type such as real-time streaming video, real-time streaming audio, etc.). Then, the connection track is routed through the router in accordance with the one or more QoS parameters.

In some embodiments, the first QoS parameter in the one or more QoS parameters is set to a second value in a second value range when the connection track is determined to not contain the first data type. In some embodiments, the first QoS parameter is a queue requirement, a path designation, or a router processor requirement.

In some embodiments, a second QoS parameter in the one or more QoS parameters is set to a second value in a second value range when the connection track is determined to contain the first data type and a third QoS parameter in the one or more QoS parameters is set to a third value in a third value range when the connection track is determined to contain the first data type. In some embodiments, the first QoS parameter is a queue requirement, the second QoS parameter is a path designation, and the third QoS parameter is a router processor requirement.

In some embodiments the first data type is video data, audio data, a photographic image, HTML, a binary executable, real-time streaming video, real-time streaming audio, or video on demand. In some embodiments, the identification of a predetermined application protocol used within the one or more first packets comprises determining whether the one or more first packets contain real-time transport protocol (RTP) information. In some embodiments, the first data type is voice data and, when the one or more first packets contain real-time transport protocol (RTP) information, the identification of a predetermined application protocol further comprises (i) determining that the connection track encodes real-time streaming video data when the one or more first data packets use the real-time streaming transport (RTSP) protocol (or an equivalent protocol) and (ii) determining that the connection track encodes real-time streaming audio data when the H.323 protocol (or an equivalent protocol) is used within the one or more first packets. As used herein, a connection track refers to those packets that encode the same message. For example, the packets that collectively encode a particular file, real-time streaming video source, real-time streaming audio source, or image form a connection track.

In some embodiments, the plurality of network layer or transport layer packets includes, but is not limited to, transmission control protocol (TCP) packets, user datagram protocol (UDP) packets, datagram congestion control packets (DCCP), stream control transmission protocol (SCTP) packets, GPRS tunneling protocol (GTP) packets, or Internet Control Message Protocol (ICMP) packets. In some embodiments, the router is a packet router. In other embodiments, the router is a flow router.

In one aspect, the first data type is real-time streaming video and the connection track comprises an encoded video and the associating step further comprises determining a characteristic of the encoded video. In some embodiments (i) the first QoS parameter is set to a second value in the first value range when a value of the characteristic is within second value range and (ii) the first QoS parameter is set to a third value in the first value range when a value of the characteristic is within a third value range. In some embodiments, the characteristic of the encoded video is a video code bitrate for the encoded video. In one example, the first QoS parameter is a queue requirement that is set to the second value when the video code bitrate is 0.5 Mbit/second or less. In another example, the first QoS parameter is a queue requirement that is set to the second value when the video code bitrate is 1.0 Mbit/second or less. In still another example, the first QoS parameter is a queue requirement that is set to the third value when the video code bitrate is 0.5 Mbit/second or greater. In yet another example, the first QoS parameter is a queue requirement that is set to the third value when the video code bitrate is 1.0 Mbit/second or greater.

In some embodiments, a wrapper (e.g., an additional header) encodes a packet in the plurality of network layer or transport layer packets and the associating step further comprises storing the first QoS parameter in the wrapper and an external lookup table is not used. In some embodiments, each packet in the plurality of network layer or transport layer packets is encoded with a wrapper in a plurality of wrappers, and the associating step further comprises (i) storing the one or more QoS parameters for the connection track in a lookup table and/or (ii) storing a pointer to the one or more QoS parameters for the connection tracks in each wrapper in the plurality of wrappers in a lookup table. In some embodiments, the lookup table comprises the QoS parameters for a plurality of connection tracks in the router. In some embodiments, the method further comprises purging the lookup table of the QoS parameters for a connection track in the plurality of connection tracks when the router completes routing of the connection track.

In some embodiments, the first data type is a video format and the one or more predetermined data type formats are one or more predetermined video type formats (e.g., any of the predetermined video type formats set forth in Table 2, below)

In some embodiments, the method further comprises (i) evaluating a router load and (ii) either (a) dropping one or more connection tracks based upon the first value for the first QoS parameter or (b) reducing traffic by changing the QoS parameters of one or more connection tracks when the router load exceeds a threshold value or some other network condition (e.g., network congestion) exists. The term "router load" refers to the amount of utilization of a router at a given time. Router utilization can be measured by any combination of several metrics including, but not limited to, the extent to which the router processor is being used in a given period of time, current available router bandwidth available as compared to total router bandwidth capability, router path bandwidth availability. In some embodiments, the first QoS parameter is a queue QoS requirement and the method further comprises (i) evaluating queue status and (ii) either (a) dropping one or more connection tracks from the router or (b) reducing traffic by changing the QoS parameters (e.g., router queue buffer size required by a connection track, maximum allowable delay time for a connection track, a connection track bandwidth requirement) of one or more connection tracks when the router queue status evaluation determines that the router cannot handle a particular connection track with its existing connection track QoS parameters. For example, in some embodiments the queue QoS parameter is buffer size and, upon evaluation of router queue status, (i) one or more connection tracks are either dropped when a router has no available queue available with sufficient buffer size and/or (ii) the buffer size QoS parameters for one or more connection tracks is downwardly adjusted. In another example, the connection track QoS parameter is maximum allowable delay time and, upon evaluation of router queue status, (i) one or more connection tracks are either dropped when the router cannot route the connection track within the maximum allowable delay time specified by the connection track QoS parameter and/or (ii) the maximum allowable delay time QoS parameter of one or more connection tracks is increased. In still another example, the connection track QoS parameter is a connection track bandwidth requirement and, upon evaluation of router queue status, (i) one or more connection tracks are either dropped when the router cannot route a connection track within the bandwidth requirements specified by the connection track QoS parameter for the connection track and/or (ii) the bandwidth QoS parameter of each of one or more connection tracks is decreased, and/or (iii) adjusting a maximum upload rate and/or a maximum download rate between the router and an Internet Service Provider. In some embodiments, the first QoS parameter is a router processor requirement, and the method further comprises (i) evaluating router processor load and (ii) either (a) dropping one or more connection tracks from the router and/or (b) changing QoS parameters of one or more connection tracks to reduce traffic through the router when insufficient router processor resource is available to process a connection track. In some embodiments, the first QoS parameter is path designation, and the method further comprises (i) evaluating router status and (ii) assigning a router path to the connection track based on the data type stored in the connection track, router status, and optionally router policy.

In some embodiments, the determination of whether the connection track encodes the first data type is performed by (i) the identification of the predetermined application protocol used within the one or more first packets and/or (ii) the comparison of a payload of one or more packets in the plurality of network layer or transport layer packets to one or more predetermined data type formats. In some embodiments, the determining whether the connection track encodes the first data type is further performed by determining a TCP or UDP port on which the router received the connection track. For example, such port information can serve as a preliminary indication of connection track data type, but more careful analysis is needed to confirm the preliminary indication (e.g., examination of application layer protocols used in the connection track packets and or comparison of the payload format of the connect track packets to the format of know data types).

Another aspect of the invention provides a computer-readable medium storing computer programs executable by a computer to perform a routing method comprising identifying a connection track comprising a plurality of network layer or transport layer packets, received by a router, by examination of one or more header fields of one or more first packets (e.g., examination of one packet, examination of two packets, examination of three packets, etc. in the connection track) in the plurality of network layer or transport layer packets. One or more QoS parameters are associated with the connection track by determining whether the connection track encodes a first data type by (i) an identification of a predetermined application protocol used within the one or more first packets and/or (ii) a comparison of a payload of one or more packets in the plurality of network layer or transport layer packets to one or more predetermined data type formats. A first QoS parameter in the one or more QoS parameters is set to a first value in a first value range when the connection track is determined to contain the first data type. The connection track is routed through the router in accordance with the one or more QoS parameters.

Another aspect of the invention provides an apparatus for routing data packets. The apparatus comprises a processor and a memory, coupled to the processor, the memory storing instructions for execution by the processor, the instructions comprising instructions for identifying a connection track comprising a plurality of network layer or transport layer packets, received by a router, by examination of one or more header fields of one or more first packets in the plurality of packets. The instructions stored by the memory further comprise instructions for associating QoS parameters with the connection track by determining whether the connection track encodes a first data type by (i) an identification of a predetermined application protocol used within the one or more first packets and/or (ii) a comparison of a payload of one or more packets in the plurality of network layer or transport layer packets to one or more predetermined data type formats. A first QoS parameter in the one or more QoS parameters is set to a first value in a first value range when the connection track is determined to contain the first data type. The memory further comprises instructions for routing the connection track through the router in accordance with the one or more QoS parameters.

In some embodiments, the memory further comprises a lookup table and each packet in the plurality of network layer or transport layer packets is encoded with a wrapper in a plurality of wrappers. In such embodiments, the associating step further comprises (i) storing the one or more QoS parameters for the connection track in the lookup table and/or (ii) storing a pointer to the one or more QoS parameters for the connection tracks in each wrapper in the plurality of wrappers in a lookup table. In some embodiments, the lookup table comprises the QoS parameters for a plurality of connection tracks in the router. In some embodiments, the memory further comprises instructions for purging the lookup table of the QoS parameters for a connection track when the router completes routing of the connection track.

BRIEF DESCRIPTION OF THE DRAWINGS

Like reference numerals refer to corresponding parts throughout the several views of the drawings.

DETAILED DESCRIPTION

Figure 1:
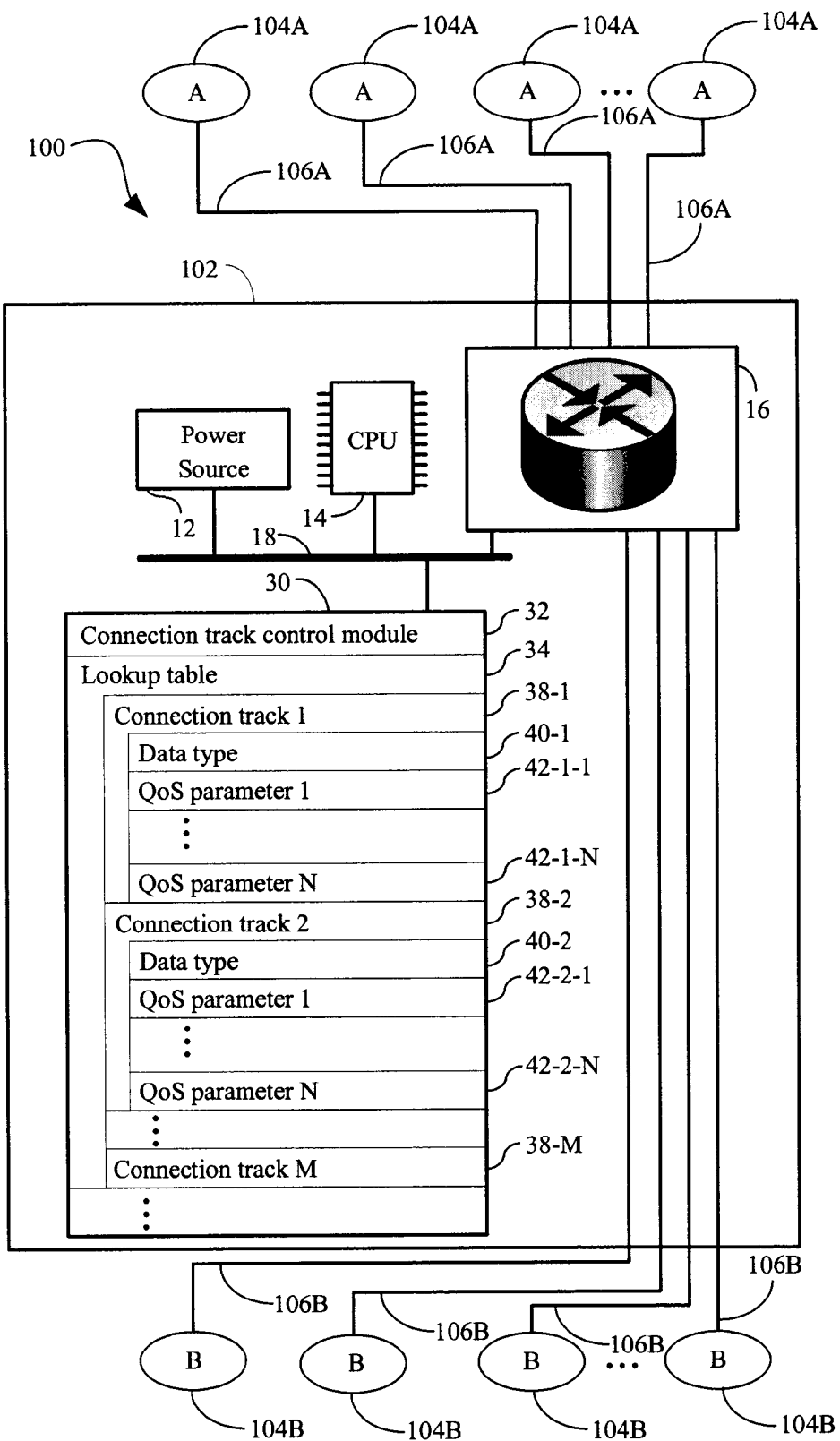
FIG. 1 illustrates a first system that includes a router for routing data.

One or more header fields of network layer or transport layer packets, received by a router, are examined and, based on the values found in the header fields, assigned to connection tracks. For example, in some embodiments, transmission control packets (TCP) are received and the source port, destination port, and/or sequence number headers are examined. TCP packets that have the same source port, destination port, and a unique sequence number are assigned to the same connection track. In this manner, those packets that are communicating the same message are assigned to the same connection track. Then, advantageously, the data type of the message carried by the connection track is determined and, from this data type, QoS parameters are assigned to the connection track.

In some embodiments, the first attempt to determine the data type of the message carried by the connection track comprises attempting to identify an application protocol used within one or more packets in the connection track. As used herein, a connection track refers to those packets that encode the same message. For example, the packets that collectively encode a particular file, real-time streaming video, real-time streaming audio, still image or audio source form a connection track. In one example, if a packet in the connection track uses real-time transport protocol (RTP), than the packet can be further examined to determine if the packet is associated with an RTP control protocol packet. If so, than the data type of the message contained in the connection track is deemed to be video. On the other hand, if the packet uses RTP, and further contains H.323, than the data type of the message contained in the connection track is deemed to be audio because H.323 is predominantly used for audio applications such as voice over Internet. In another example, the HTTP protocol can carry either HTML data or real-time streaming video. Thus, if a packet in the connection track uses the HTTP protocol, than the packet can be further examined to determine if the packet contains HTML. If the packet does contain HTML, than the data type of the message contained in the connection track is deemed to be HTML. On the other hand, if the packet uses a real-time streaming video protocol, than the data type of the message contained in the connection track is deemed to be real-time streaming video. It will be appreciated that for some protocols, more than one packet will need to be examined in order to verify that the above-identified protocols are present in the connection track packets.

If the attempt to determine the data type of the message contained within the connection track by examination of one or more packets for application layer protocols is not successful, than the payload of one or more packets in the connection track is compared to one or more predetermined data type formats. For example, the payload can be compared to the format of MPEG-4 video format to determine if the message type is video.

Once the data type of the message contained in a connection track is determined (e.g., by determining one or more application protocols contained within one or more packets and/or comparison of the payload of one or more packets to known data types), QoS parameters are assigned to the connection track. For example, if the connection track contains a message having a real-time streaming video message type, QoS parameters that will ensure that the video is streamed to an endpoint at a rate that will prevent noticeable interruption of the video are assigned to the connection track. If the message type is real-time streaming audio, QoS parameters that will ensure that the audio is streamed to an endpoint at a rate that will prevent interruption of the audio are assigned to the connection track. Other exemplary message types that are assigned unique QoS parameters include, but are not limited to, non-streaming video, non-streaming audio, web pages, FTP transmissions, and HTML.

Once the data type of the message contained in a connection track is determined, the message track is routed through the router in accordance with the one or more QoS parameters assigned to the connection track. This process provides the advantage of routing connection tracks based on data type. Moreover, the QoS parameters assigned to a connection track can optionally be used in conjunction with QoS parameters imposed by an Internet Service Provider or other QoS parameters (e.g., the IEEE 802.1 standard). The inventive process leads to improved router performance. At times when the router is receiving too much data, the inventive process allows the router to make intelligent decisions about which connection tracks to route and which connection tracks to drop. For example, assume that the router can only route N streaming videos at any given time and still deliver the streaming video to endpoints in real time. If the router is receiving M connection tracks that each contain streaming video, where M is greater than N, than the router can proactively drop M–N of the connection tracks in order to deliver the N connection tracks in real time.

FIG. 1 details an exemplary system that supports the functionality described above. In particular, FIG. 1 illustrates a network 100 in which a network switch 16 of router 102 connects start points 104A with endpoints 104B. Each of devices 104 can be any network device, such as a computer, a printer, another network switch, or the like. Switch 16 transfers (routes) data, such as connection tracks, between devices 104 over channels 106A and 106B, and can also handle an arbitrary number of devices in addition to the devices 104 depicted in FIG. 1. Channels 106 can include fiber optic links, wireline links, wireless links, and the like. In some embodiments, router 102 is a packet router. In some embodiments, router 102 is a flow router.

An exemplary router 102 comprises:
a central processing unit or other form of microcontroller 14;
a system memory 30, for storing system control programs, data, and application programs; system memory 30 may also include read-only memory (ROM) or other forms of computer readable media such as a hard disk drive;
switch circuitry 16 for routing packets and/or flows;
an internal bus 18 or other electronic communication system for interconnecting the aforementioned elements; and
a power source 12 to power the aforementioned elements.

As illustrated in FIG. 1, memory 30 includes a connection track control module 32 for assigning QoS parameters to a connection track based on the data type of the message contained within the connection track. In some embodiments, connection track control module 32 includes instructions for performing any of the methods disclosed herein. Memory 30 further includes a lookup table 34 that can be used to store the QoS parameters 42 of each of the connection tracks 38 that the router 102 is routing at any given time. Lookup table 34 can optionally further store the message data type 40 of each of the connection tracks 38 that the router 102 is routing at any given time. Each of the data structures in memory 30, including lookup table 34 and each of the connection track data structures 38 can comprise any form of stored data including, but not limited to, flat ASCII or binary files, a relational database (SQL), or an on-line analytical processing (OLAP) database (MDX and/or variants thereof). Furthermore, such data structures can be stored in router 102 and/or in a device that is in electronic communication with router 102 over a wide area network such as the Internet, or a local network.

Figure 3:
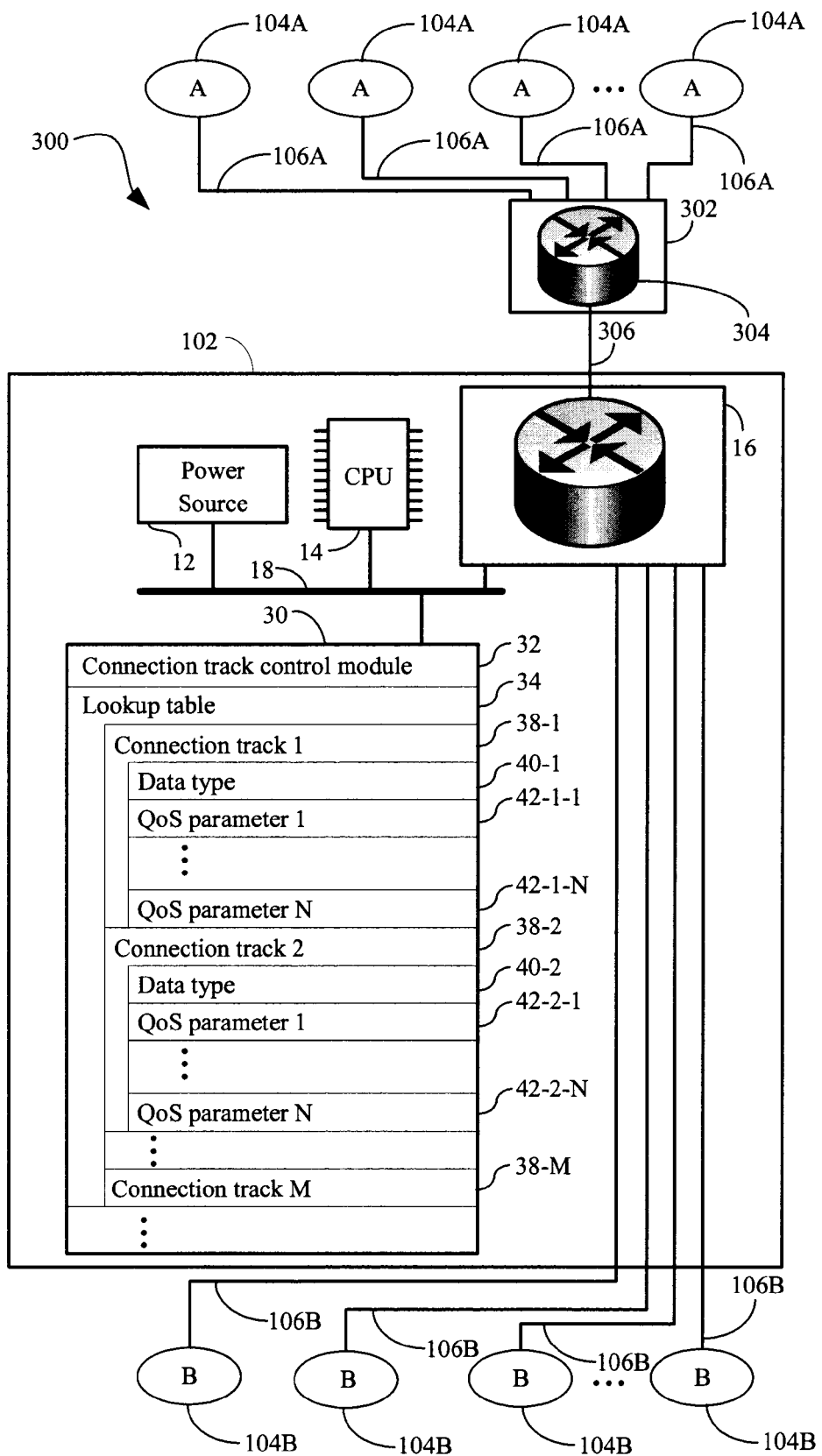
FIG. 3 illustrates a second system that includes a router for routing data.

FIG. 3 shows a network 300 that is identical to that of network 100 of FIG. 1 with the exception that more details are given for the connection between router 102 and start points 104A in accordance with a particular exemplary embodiment. In the particular exemplary embodiment illustrated in FIG. 3, data from start points 104A is provided to router 102 through Internet Service Provider (ISP) 302. Internet Service Provider 302 includes one or more network switches 304 that routes electronic information (e.g., data packets) from start points 104A to router 102 across line 306. Router 102 then routes the packets to end points 104B. Of course, end points 104B can communicate electronic information to start points 104A through the reverse path. In typical embodiments, line 306 is characterized by an access speed that is set by ISP 302. For example, ISP 302 may set a download speed (data flowing to router 102) and a different upload speed (data flowing to ISP 302 from router 102). For example, the download speed may be set at 56 kbits/sec, 64 kbits/sec, 256 kbits/sec, 1.5 Mbits/sec, 5 Mbits/sec, 6 Mbits/sec, 7 Mbits/sec or higher. Upload speed may be set dependently or independently of download speed at 56 kbits/sec, 64 kbits/sec, 256 kbits/sec, 1.5 Mbits/sec, 5 Mbits/sec or higher. Other upload and download speeds are possible as well.

Figure 2:
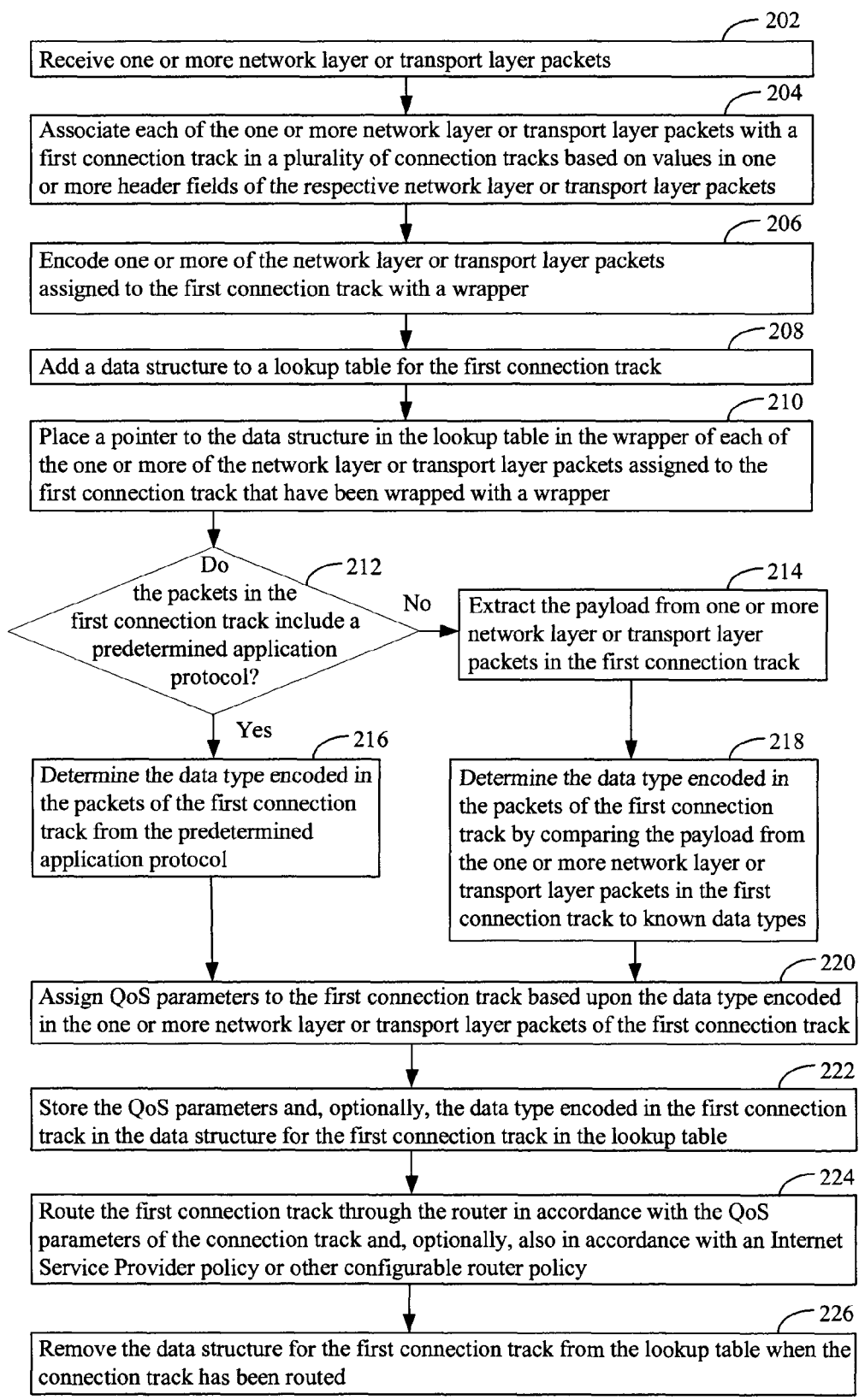
FIG. 2 illustrates a process for routing data.

Now that a router 102 in accordance with various embodiments of the present invention have been disclosed in conjunction with FIGS. 1 and 3, an exemplary method for routing will be disclosed in conjunction with FIG. 2.

Step 202. In step 202, one or more network layer or transport layer packets are received. Examples of network layer (also known as the Internet layer) packets include, but are not limited to Internet group management protocol (IGMP) packets, Internet control message protocol (ICMP) packets, Resource ReSerVation Protocol (RSVP) packets, IP security (IPsec) packets, address resolution protocol (ARP) packets, and reverse address resolution protocol (RARP) packets. Examples of transport layer packets include, but are not limited to, transmission control protocol (TCP) packets, user datagram protocol (UDP) packets, datagram congestion control packets (DCCP), stream control transmission protocol (SCTP) packets, and GPRS tunneling protocol (GTP) packets. It will be appreciated that transport layer packets will necessarily include an underling network layer protocol (e.g., TCP/IP). As used, herein, a packet is referred to as a network layer packet when the header of the network protocol within the packet is examined for the purpose of assigning the packet to a connection track even though the packet may include other protocols such as a transport layer protocol. As used herein, a packet is referred to as a transport layer packet when the header of the transport layer protocol within the packet is examined for the purpose of assigning the packet to a connection track even though the packet may include other protocols such as a network layer protocol. Moreover, in some instances, the header of both a network layer and a transport layer protocol encoded in a packet are examined for the purposes of assigning the packet to a connection track. In such instances, the packet may be referred to as a network layer packet or a transport layer packet.

Step 204. In step 204, one or more network layer or transport layer packets received by a router are associated with a first connection track 38 in a plurality of connection tracks based on values in one or more header fields of the respective network layer or transport layer packets. For example, in some embodiments, transmission control packets (TCP) are received and the source port, destination port, and sequence number header TCP headers are examined. TCP packets that have the same source port, destination port, and a unique sequence number are assigned to the same connection track. It will be appreciated that at any given time, router 102 will receive data packets for more than one connection track. In such instances, step 204 assigns packets to different connection tracks 38 so that each connection track 38 comprises packets that encode the same message. For example, a first set of packets received by the router 102 that contain a first message will be designated as a first connection track 38 whereas a second set of packets received by the router that contain a second message will be designated as a second connection track 38.

Steps 206-210. In step 206, one or more of the network layer or transport layer packets assigned to a particular connection track 38 are encoded with a wrapper. The wrapper identifies the packets as belonging to the particular connection track 38. In step 208, a data structure is added to lookup table 34 for the first connection track. In typical embodiments, the data structure added in step 208 uniquely represents the particular data structure. Thus, the data structure is given the same reference 38 as the particular connection track 38 that it represents. For example, referring to FIG. 1, connection track 38-1 in lookup table 34 represents connection track 38-1, connection track 38-2 represents connection track 38-2, and so forth. In step 210, a pointer to the data structure in the lookup table that represents the particular connection track is placed in the wrapper of each of the one or more of the network layer or transport layer packets assigned to the particular connection track. In this way, the identity of the connection track that incoming packets belong to is stored in an efficient manner in the data packets that make up the connection track.

Step 212. In step 212, a determination is made as to whether the packets in a given connection track include a predetermined application layer protocol. A predetermined application layer protocol is one in which the data type of the connection track can be conclusively determined from the identity of the application layer protocol itself. The application layer is the seventh level of the seven-layer open systems interconnection basic reference model (OSI reference model or OSI model for short). It interfaces directly to and performs common application services for the application processes. It also issues requests to the presentation layer. The OSI model is a layered, abstract description for communications and computer network protocol design, developed as part of open systems interconnection (OSI) initiative. It is also called the OSI seven layer model and is described in ISO 7498 and its various addenda.

Advantageously, not all of the packets in the connection track need to be examined in step 212. In some embodiments, only a single packet in the connection track is examined for the purpose of identifying an application protocol. Examples of application protocols include, but are not limited to, dynamic host configuration protocol (DHCP), domain name system (DNS) protocol, file transfer protocol (FTP), gopher, multipurpose Internet mail extension protocol, post office protocol version 3 (POP3) protocol, session initiation protocol (SIP) protocol, simple mail transfer protocol (SMTP), simple network management protocol (SNMP), secure shell (SSH) protocol, teletype network (TELNET) protocol, border gateway protocol (BGP), remote procedure call (RPC) protocol, real-time transport protocol (or RTP), transport layer security (TLS) protocol, secure sockets layer (SSL) protocol, session description protocol (SDP, RFC 4566), and simple object access protocol (SOAP, service oriented architecture protocol). If the packets contain a predetermined protocol (212-Yes), process control passes to step 216, otherwise (212-No), process control passes to step 214.

In some embodiments, the identification of a predetermined application protocol (212-Yes) comprises determining whether one or more packets in the connection track contains real-time transport protocol (RTP) information. In some embodiments, one or more packets contain real-time transport protocol (RTP) information and the identification of a predetermined application protocol (212-Yes) further comprises (i) determining that the connection track encodes video data when the one or more packet use the real-time streaming transport (RTSP) protocol and (ii) determining that the connection track encodes voice data when the H.323 protocol is used within the one or more packets.

In some embodiments, the TCP or UDP port number on which the router received the connection track is used in conjunction with the identification of any of the aforementioned protocol types to determine the data type of the message encoded in the connection track. As illustrated in Table 1 below, much information about the protocol used, and therefore data type of the message encoded in the connection track, can be determined by the identity of the port used to transmit the connection track to the router.

TABLE 1

Services typically associated with particular TCP and UDP ports

| Service | TCP | UDP | Notes |
|---|---|---|---|
| SSH | 22 | | Secure Shell |
| HTTP | 80 | | HyperText Transfer Protocol * (e.g. for web browsing). Currently (2003-07-05) HTTP/1.1 is officially described in RFC 2616. |
| HOSTS2 Name Server | 81 | 81 | |
| XFER Utility | 82 | 82 | |
| RPC Endpoint Mapper | 135 | 135 | registered as "epmap - DCE endpoint resolution". Used by Microsoft for RPC locator service. |
| LDAP | 389 | 389 | Lightweight Directory Access Protocol * |
| MS NetMeeting | LDAP or ULP, dyn >= 1024, 1503, H.323 HostCall, MS ICCP | dyn >= 1024 | Videoconferencing |
| Timbuktu | 407, 1417-1420 | 407 | remote control |
| SLP | 427 | 427 | Service Location Protocol; Used by MacOS and NetWare. |
| HTTPs | 443 | | secure HTTP (SSL) |
| LPD/printer | 515 | 515 | Printing; LPD stands for Line Printer Daemon. |
| ULP | 522 | 522 | User Location Protocol (Microsoft) |
| AppleTalk Filing Protocol (AFP) | 548 | 548 | |
| QuickTime 4 | RTSP | RTP-QT4 | streaming audio, video |

TABLE 1-continued

Services typically associated with particular TCP and UDP ports

| Service | TCP | UDP | Notes |
|---|---|---|---|
| RTSP | 554 | | Real Time Streaming Protocol. Currently (2003-07-05) described in RFC 2326. |
| NNTPs | 563 | | secure NNTP news (SSL) |
| Internet Printing Protocol (IPP) | 631 | 631 | print remotely to any IPP enabled printer through the Internet; The Common Unix Printing System (CUPS) is based on IPP. Also see printing section. |
| LDAPs | 636 | 636 | secure LDAP; (LDAP protocol over TLS/SSL) |
| Doom | 666 | 666 | network game |
| Remotely Possible (ControlIT) | 799 | | remote control. CA ControlIT support. |
| VMware Virtual Machine Console | 902 | | remote control and viewing of virtual machines. vmware-authd. |
| SOCKS | 1080 | | internet proxy; Also used by Trojans. |
| OpenVPN | 1194 | 1194 | * |
| Kazaa | 1214 | 1214 | peer-to-peer file sharing |
| WASTE | 1337 | 1337 | peer-to-peer. Also see InfoAnarchy WASTE FAQ. This port is officially registered for Men and Mice DNS (QuickDNS Remote). |
| Lotus Notes Domino | 1352 | | |
| VocalTec Internet Phone | 1490, 6670, 25793 | 22555 | videoconferencing |
| Citrix ICA | 1494, dyn >= 1023 | 1604, dyn >= 1023 | remote application access |
| Virtual Places | 1533 | | conferencing, also see VP voice |
| Xing StreamWorks | | 1558 | streaming video |
| Novell GroupWise (Remote Client) | 1677 | 1677 | group collaboration; NOTE: Other features of GroupWise use many other ports. |
| H.323 Host Call | 1720 | 1720 | H.323 host call |
| PPTP | 1723 | | virtual private network (VPN) |
| MS ICCP | 1731 | 1731 | audio call control (Microsoft) |
| MS NetShow | 1755 | 1755, dyn >= 1024 <= 5000 | streaming video |
| MSN Messenger | 1863 | | instant messaging |
| Netopia netOctopus | 1917, 1921 | 1917 | network management |
| Big Brother | 1984 | 1984 | network monitoring |
| ICU II | 2000-2003 | | videoconferencing |
| iSpQ | 2000-2003 | | videoconferencing |
| glimpseserver | 2001 | | search engine |
| Distributed.Net RC5/DES | 2064 | | distributed computation |
| SoulSeek | 2234, 5534 | 2234, 5534 | file sharing |
| Microsoft DirectX gaming (DirectPlay) 7 | 2300-2400, 47624 | 2300-2400 | networked multiplayer games |
| Microsoft DirectX gaming (DirectPlay) 8 | | 2302-2400, 6073 | networked multiplayer games; only 6073 is registered as DirectPlay8 |
| MADCAP - Multicast Address Dynamic Client Allocation Protocol | 2535 | 2535 | defined in RFC 2730 - Multicast Address Dynamic Client Allocation Protocol (MADCAP); Also used by Trojans. |
| Netrek | 2592 | | network game |
| ShareDirect | 2705 | 2705 | peer-to-peer (P2P) filesharing. Officially registered for Sun SDS Administration |
| URBISNET | 2745 | 2745 | . |
| Borland Interbase database | 3050 | 3050 | gds_db; See CERT Advisory CA-2001-01 for potential security risk. |
| squid | 3128 | 3130 | web proxy cache; also used by Trojans. |
| iSNS | 3205 | 3205 | Internet Storage Name Service |
| iSCSI default port | 3260 | 3260 | SCSI over IP |
| Windows Remote Desktop Protocol (RDP) | 3389 | | registered as ms-wbt-server. RDP 5.1 is the current version; Remote Desktop Web Connection also uses HTTP. |
| NetworkLens SSL Event | 3410 | 3410 | |
| Virtual Places Voice Chat | 3450, 8000-9000 | | voice chat |
| Apple iTunes music sharing (DAAP) | 3689 | 3689 | Digital Audio Access Protocol |
| World of Warcraft | 3724 | | online game |

TABLE 1-continued

Services typically associated with particular TCP and UDP ports

| Service | TCP | UDP | Notes |
|---|---|---|---|
| Mirabilis ICQ | dyn >= 1024 | 4000 | locator, chat |
| Blizzard/Battle.net | 4000, 6112-6119 | 4000, 6112-6119 | network gaming - support (captured 2001-11-11), proxy and firewall info |
| Abacast | 4000-4100, 4500, 9000-9100 | | peer-to-peer audio and video streaming. |
| GlobalChat client, server | 4020 | 4020 | chat rooms, used to be called ichat |
| PGPfone | | 4747 | secure phone |
| PlayLink | 4747, 4748, 10090 | 6144 | online games |
| radmin | 4899 | 4899 | remote control |
| Yahoo Messenger - Voice Chat | 5000-5001 | 5000-5010 | voice chat |
| GnomeMeeting | H.323 HostCall, 30000-30010 | 5000-5003, 5010-5013 | audio and videoconference. 5000-5003 is RTP and RTCP range for this app. |
| Yahoo Messenger - messages | 5050 | | Messaging; It will try ports 5050, 80, any port. |
| SIP | 5060 | 5060 | Session Initiation Protocol; For audio and video. Currently (2003-07-05) see RFCs 3261, 3262, 3263, 3264, 3265 |
| Apple iChat AV | | SIP, RTP-iChatAV | audio and video conferencing; may also need iChat local port. |
| Yahoo Messenger - Webcams | 5100 | | video |
| AOL Instant Messenger (AIM) | 5190 | 5190 | America OnLine; Also used by Apple iChat (in AIM compatibility mode). |
| AIM Video IM | 1024-5000 ? | 1024-5000 ? | video chat |
| AOL ICQ | 5190, dyn >=1024 | | messaging |
| AOL | 5190-5193 | 5190-5193 | America OnLine |
| XMPP/Jabber | 5222, 5269 | 5222, 5269 | Extensible Messaging and Presence Protocol; Defined by XMPP specs (RFCs now issued), specs created by IETF group. |
| Qnext | 5235-5237 | 5235-5237 | audio/video conference, fileshare, everything. Port 5236 is officially assigned to "padl2sim". |
| iChat local traffic | 5298 | 5298 | |
| Multicast DNS | 5353 | 5353 | Mac OS X 10.2: About Multicast DNS. Related to Zeroconf which Apple has implemented as Rendezvous. (Note: the regular Domain Name Service port is 53.) |
| Dialpad.com | 5354, 7175, 8680-8890, 9000, 9450-9460 | dyn >= 1024 | telephony |
| HotLine | 5500-5503 | | peer-to-peer filesharing. |
| SGI ESP HTTP | 5554 | 5554 | SGI Embedded Support Partner (ESP) web server; Also used by Trojans, see SGI Security Advisory 20040501-01-I. |
| InfoSeek Personal Agent | 5555 | 5555 | This port is commonly used by HP OpenView Storage Data Protector (formerly HP OmniBack). |
| pcAnywhere | 5631 | 5632 | remote control |
| eShare Chat Server | 5760 | | |
| eShare Web Tour | 5761 | | |
| eShare Admin Server | 5764 | | |
| VNC | 5800+, 5900+ | | remote control |
| Blizzard Battle.net | 6112 | 6112 | online gaming |
| GNUtella | 6346, 6347 | 6346, 6347 | peer-to-peer file sharing |
| Netscape Conference | H.323 HostCall, 6498, 6502 | 2327 | audioconferencing |
| Danware NetOp Remote Control | 6502 | 6502 | remote control |
| common IRC | 6665-6669 | | Internet Relay Chat |
| Net2Phone CommCenter | selected | 6801, selected | telephony |
| BitTorrent | 6881-6889, 6969 | | distributed data download, newer versions TCP 6881-6999; Alternate FAQ link. |

TABLE 1-continued

Services typically associated with particular TCP and UDP ports

| Service | TCP | UDP | Notes |
|---|---|---|---|
| Blizzard Downloader | World of Warcraft, Battle.net and BitTorrent | | downloads patches for World of Warcraft |
| RTP-QT4 | | 6970-6999 | Real-time Transport Protocol; These ports are specifically for the Apple QT4 version. |
| VDOLive | 7000 | user-specified | streaming video |
| Real Audio & Video | RTSP, 7070 | 6970-7170 | streaming audio and video |
| CU-SeeMe, Enhanced CUSM | 7648, 7649, LDAP | 7648-7652, 24032 | videoconferencing |
| common HTTP | 8000, 8001, 8080 | | |
| Apache JServ Protocol v12 (ajp12) | 8007 | 8007 | (default port) |
| Apache JServ Protocol v13 (ajp13) | 8009 | 8009 | (default port) e.g. Apache mod_jk Tomcat connector using ajp13. See Workers HowTo for config info. |
| Grouper | 8038 | 8038 | peer-to-peer (P2P) filesharing |
| PDL datastream | 9100 | 9100 | Printing' PDL is Page Description Language. Used commonly by HP printers and by Apple. |
| MonkeyCom | 9898 | 9898 | video-chat, also used by Trojans |
| iVisit | | 9943, 9945, 56768 | videoconferencing |
| The Palace | 9992-9997 | 9992-9997 | chat environment |
| common Palace | 9998 | | chat environment |
| NDMP | 10000 | 10000 | Network Data Management Protocol; Used for storage backup. Also used by Trojans. |
| Amanda | 10080 | 10080 | backup software; Also used by Trojans. |
| Yahoo Games | 11999 | | network games |
| Italk | 12345 | 12345 | network chat supporting multiple access methods; appears mostly used in Japan. There are many other applications calling themselves "italk". TrendMicro OfficeScan antivirus also uses this port. Commonly used by Trojans. |
| RTP-iChatAV | | 16384-16403 | Used by Apple iChat AV. |
| RTP | | 16384-32767 | Real-time Transport Protocol; RTP in general is described in RFC 3550. |
| Palm Computing Network Hotsync | 14237 | 14238 | data synchronization |
| Liquid Audio | 18888 | | streaming audio |
| FreeTel | | 21300-21303 | audioconferencing |
| VocalTec Internet Conference | 22555 | 22555 | audio & document conferencing |
| Quake | 26000 | 26000 | network game |
| MSN Gaming Zone | 28800-29100 | 28800-29100 | network gaming (zone.com, zone.msn.com), also see DirectPlay 7 and DirectPlay 8 |
| Sygate Manager | | 39213 | |

Steps 214, 218. Step 214 is reached when the packets examined in step 212 did not contain a protocol that conclusively identified the data type of the message contained by the connection track 38. In such instances, the payload from one or more packets in the connection track is extracted (step 214) and the file structure of the payload is compared to the file structure of known data types (step 218). In some embodiments, the payload from only a single packet is extracted and compared to the file structure of known data types. In some embodiments, the payload from two or more packets of a single connection track 38 are extracted and compared to known file types. In some embodiments, the file format of the one or more data packets is compared to any of the file formats listed in Table 2.

TABLE 2

Nonlimiting exemplary video file formats

| Extension | File format |
|---|---|
| .3g2, .3gp, .3gp2, .3gpp | 3GPP Multimedia File |
| .3mm | 3D Movie Maker Movie |
| .60d, .ajp | CCTV Video Clip |
| .asf | Advanced Systems Format File |
| .asx | Microsoft ASF Redirector File |
| .avi | Audio Video Interleave File |
| .avs | Application Visualization System Format |
| .bik | BINK Video File |
| .bix, .box | Kodicom Video |
| .byu | Brigham Young University Movie |
| .cvc | cVideo |
| .dce | DriveCam Video |
| .dif | Digital Interface Format |
| .dir | Macromedia Director Movie |

TABLE 2-continued

Nonlimiting exemplary video file formats

| Extension | File format |
|---|---|
| .divx | DivX-Encoded Movie |
| .dv | Digital Video File |
| .dvr-ms | Microsoft Digital Video Recording |
| .dxr | Protected Macromedia Director Movie |
| .eye | Eyemail Video Recording |
| .fla | Macromedia Flash Animation |
| .flc | FLIC Animation |
| .fli | FLIC Animation |
| .flv | Flash Video |
| .flx | FLIC Animation |
| .gl, .grasp | GRASP Animation |
| .gvi | Google Video File |
| .gvp | Google Video Pointer |
| .ifo | DVD-Video Disc Information |
| .imovieproject | iMovie Project |
| .ivf | Indeo Video Format File |
| .ivs | Internet Streaming Video |
| .izz | Isadora Patch |
| .lsf | Streaming Media Format |
| .lsx | Streaming Media Shortcut |
| .m1v | MPEG-1 Video File |
| .m2v | MPEG-2 Video |
| .m4e | MPEG-4 Video File |
| .m4u | MPEG-4 Playlist |
| .m4v | iTunes Video File |
| .mjp | MJPEG Video File |
| .mkv | Matroska Audio/Video File |
| .moov, .mov | Apple QuickTime Movie |
| .movie | QuickTime Movie |
| .mp4 | MPEG-4 Video File |
| .mpe | MPEG Movie File |
| .mpeg, .mpg | MPEG Video File |
| .mpv2 | MPEG-2 Video Stream |
| .msh | Visual Communicator Project File |
| .mswmm | Windows Movie Maker Project |
| .mvb | Multimedia Viewer Book Source File |
| .mvc | Movie Collector Catalog |
| .nvc | NeroVision Express Project |
| .ogm | Ogg Vorbis Video File |
| .omf | Open Media Framework |
| .prproj | Premiere Pro Project |
| .prx | Windows Media Profile |
| .qt | Apple QuickTime Movie |
| .qtch | QuickTime Cache File |
| .rm | Real Media File |
| .rmvb | RealVideo Variable Bit Rate |
| .rp | RealPix Clip |
| .rts | RealPlayer Streaming Media |
| .rts | QuickTime Real-Time Streaming Format |
| .scm | ScreenCam Recording |
| .smil | Synchronized Multimedia Integration Language |
| .smv | VideoLink Mail Video |
| .spl | FutureSplash Animation |
| .ssm | Standard Streaming Metafile |
| .svi | Samsung Video File |
| .swf | Macromedia Flash Movie |
| .tivo | TiVo Video File |
| .vdo | VDOLive Media File |
| .vfw | Video for Windows |
| .vid | QuickTime Video |
| .viewlet | Qarbon Viewlet |
| .viv | VivoActive Video File |
| .vivo | VivoActive Video File |
| .vob | DVD Video Object |
| .vro | DVD Video Recording Format |
| .wm | Windows Media |
| .wmd | Windows Media Download Package |
| .wmv | Windows Media Video File |
| .wmx | Windows Media Redirector |
| .wvx | Windows Media Video Redirector |

In some embodiments the HTTP, FTP, or HTTPS protocol is identified in the examined packets and the payload of one or more packets in the connection track are examined to determine if the message encoded in the connection track is video on demand by comparing the file structure of the payload of the one or more packets to the file structure of predetermined video on demand formats. In some embodiments, the RTSP, MMS, RTP unicast, RTP multicast, HTTP, or UDP protocol is identified in the examined packets and the payload of one or more packets in the connection track are examined to determine if the message encoded in the connection track is real-time streaming video by comparing the file structure of the payload of the one or more packets to the file structure of predetermined real-time streaming video formats.

Step 216. Step 216 is reached when the data type encoded in the packets inspected in step 212 includes a predetermined application protocol. In one example, the predetermined protocol is a multimedia streaming protocol such as real-time streaming protocol (RTSP), real-time transport control (RTP), real-time transport control (RTCP), or multimedia messaging service (MMS) and when such a protocol is found in the connection track packets, the data type of the message contained within the connection track is deemed to be real-time streaming video. In some embodiments, the packets must contain RTSP or MMS in order for the data type of the message contained within the connection track to be deemed real-time streaming video. In some embodiments, when the packets include the RTP and H.323 protocols, the connection track is deemed to be voice.

Steps 212, 214, 216, and 218 serve to identify a data type of the message encoded in a connection track. One of skill in the art will appreciate that there are many possible variants to steps 212, 214, 216, and 218. For instance, it is possible in some embodiments to always compare the payload of one or more packets in the connection track to know data types and never examine packet headers for the presence of predetermined application layer protocols. Further, in some embodiments, it is possible to always look at packet headers for the presence of predetermined application layer protocols as well as to always compare the payload of one or more data packets in the connection track to known data formats. Furthermore, any method for conclusively determining the data type of the message encoded within the connection track is within the scope of the present application, including methods that do not involve determining the presence of a predetermined application protocol in the header of one or more packets in the connection track or examination of the packet payload of one or more packets in the connection track.

Step 220. By the time step 220 is reached, the data type of the message in the connection track is known. In step 220, QoS parameters are assigned to the connection track based upon this data type. Exemplary data types include, but are not limited to, real-time streaming video, video on demand, audio data, a photographic image, an executable binary program, and HTML. Exemplary QoS parameters that can be set for a connection track include, but are not limited to, any combination of queue requirement, path designation, and router processor requirements.

The queue requirement QoS parameter refers to any of one or more queue related QoS parameters including, but not limited to, buffer size required by the connection track, maximum allowable delay tolerated by the connection track and/or the bandwidth requirements of the connection track. For example, more intensive connection track message data types such as real-time streaming video require higher bandwidths. As an additional example, connection tracks message data types such as real-time streaming audio require reduce allowable delay.

The path designation QoS parameter refers to the router path that should be used by a connection track. A slow router path is used for non-timing critical connection track data types such as FTP downloads. A fast router path is used for either timing critical connection track message types such as real-time streaming video, real-time audio, and/or connection tracks that contain a large amount of data. In some embodiments, the path designation QoS parameter is assigned a value in a value range, where one end of the value range indicates a fast router path (e.g., bypass the router processor or use a hardware-specified fast router path) and the other end of the value range indicates a slow router path (e.g., do not bypass the router processor and do not use a hardware-specified fast router path). Thus, for example, in some embodiments, the path designation QoS parameter is a number in the range between 1 and 4 includes, where 1 indicates the slowest router path and 4 indicates the fastest router path. In such embodiments, a connection track that encodes a message whose data type is real-time streaming video could be assigned a path designation QoS parameter of "4" whereas a connection track that encodes a message whose data is an executable binary could be assigned a path designation QoS parameter of "1".

The router processor requirement QoS parameter provides an indication of the amount of router processor power that will be required to route the connection track 38. The router processor requirement QoS parameter is advantageous because it can be used by connection track control module 32 to determine whether the router can handle the connection track. For example, if the router processor 14 is already fully utilized processing other connection tracks, than module 32 can make the decision to completely drop a new connection track with computationally intensive router processor requirements.

The queue requirement, path designation, and router processor requirement QoS parameters are merely exemplary parameters that can be constructed for a given connection track 38. In some embodiments, the data type of the message encoded in the connection track is also stored in the data structure 38 created for the connection track (e.g., element 40 of FIG. 1). In some embodiments, the data type of the message encoded in the connection track is not stored in the data structure 38 created for the connection track (e.g., element 40 of FIG. 1) because such information is redundant to the values of the QoS parameters assigned to the connection track in such embodiments.

Advantageously, QoS parameters can be set for connection tracks without intensive manual intervention. The values of such QoS parameters are determined by the application layer data type of the message encoded in the packets of the connection track. Accordingly, in one embodiment, a first QoS parameter in the one or more QoS parameters associated with a first connection track is set to a first value in a first value range when the message encoded within the connection track is of first data type. The first QoS parameter is set to a second value in a second value range when the message encoded within the connection track is determined to not be of the first data type. In some embodiments, a second QoS parameter in the one or more QoS parameters associated with the first connection track is set to a second value in a second value range when the message encoded within the connection track is determined to be the first data type. Moreover, a third QoS parameter in the one or more QoS parameters associated with the connection track is set to a third value in a third value range when the message encoded in the first connection track is determined to contain the first data type. In some embodiments, the first QoS parameter is a queue requirement, the second QoS parameter is a path designation, and the third QoS parameter is a router processor requirement. In some embodiments, the first data type is real-time streaming video, video on demand, audio data, a photographic image, an executable binary program, or HTML. In some embodiments, the first QoS parameter is a queue requirement, a path designation, or a router processor requirement.

In some embodiments, the data type of the message is real-time streaming video or real-time streaming audio and further characterization of the message is sought in order to assign QoS parameters to the connection track that encodes the message. For instance, if the message is video that has a very low bitrate, than QoS parameters appropriate for the low resolution video are assigned to the connection track that encodes the video. On the other hand, if the message is a video that has a very high bitrate, than QoS parameters appropriate for the high resolution video are assigned to the connection track. In another example, if the message is video that delivers a low number of frames per second, than QoS parameters appropriate for such video are assigned to the connection track that encodes the video. On the other hand, if the message is a video that has a very high number of frames per second, than different QoS parameters appropriate for such video are assigned to the connection track.

In some embodiments, a first QoS parameter associated with a connection track is set to a second value in a first value range when a value of the characteristic is within second value range and the first QoS parameter is set to a third value in the first value range when a value of the characteristic is within a third value range. For example, in some embodiments, the data type is real-time streaming video, the characteristic of the encoded video is a video code bitrate for the encoded video, and the first QoS parameter is a queue requirement, where the queue requirement is set to the second value when the video code bitrate is 0.5 Mbit/second or less. In another example, the data type is real-time streaming video, the characteristic of the encoded video is a video code bitrate for the encoded video, and the first QoS parameter is a queue requirement, where the queue requirement is set to the second value when the video code bitrate is 1.0 Mbit/second or less. In still another example, the data type is real-time streaming video, the characteristic of the encoded video is a video code bitrate for the encoded video, and the first QoS parameter is a queue requirement, where the queue requirement is set to the third value when the video code bitrate is 0.5 Mbit/second or greater. In still another example, the data type is real-time streaming video, the characteristic of the encoded video is a video code bitrate for the encoded video, and the first QoS parameter is a queue requirement, where the queue requirement is set to the third value when the video code bitrate is 1.0 Mbit/second or greater.

Step 222. In step 222, the one or more QoS parameters assigned to the connection track are stored in a data structure 38 constructed for the connection track in lookup table 34. Optionally the data type of the message encoded within the connection track is stored in the data structure as data type 40.

Step 224. In step 224, the connection track is routed through the router by connection track control module 32 in accordance with the QoS parameters 42 of the connection track stored in the lookup table 34. Optionally, the connection track is routed in accordance with the QoS parameters 42 as well as QoS parameters imposed by an Internet Service Provider policy or some other user configurable router QoS policy.

In some embodiments, router 102 monitors the amount of data being downloaded as well as the amount of data being uploaded over line 306. When data is being downloaded to router 102 at a speed that approaches the maximum download speed set by ISP 302, router 102 sends a request to ISP 302 to temporarily increase the maximum download speed set by ISP 302. For example, in some embodiments when data is being downloaded to router 102 at speeds that approach 65 percent, 70 percent, 75 percent, 80 percent, 85 percent, or 90 percent of the maximum download speed, router 102 will send a request to ISP 302 to increase the download speed. In one user case scenario, consider the case where the maximum download speed set by ISP 302 for router 102 is 1.5 Mbits/sec and that data is being downloaded to the router at 1.3 Mbits/sec. Since the rate of 1.3 Mbits/sec approaches the maximum rate set by ISP 302, router 102 sends a request to ISP 302 to temporarily increase the maximum download speed for line 306 to 3 Mbits/sec. Router 102 continues to monitor download rates and can make additional requests to ISP 302 to increase the maximum download speed as needed. Moreover, when router 102 is no longer receiving data at rates that approach the maximum download speed set by ISP 302, router 102 can make a request to ISP 302 to restore the maximum download speed to router 102 to the default speed. This procedure is advantageous because it is performed without the need for intervention from an end-point 104B user or the router 102 administrator.

In some embodiments, ISP 302 rather than router 102 monitors the amount of data being sent to router 102 over line 306 and automatically increases the maximum download speed to router 102 when the amount of data being sent approaches the maximum download speed permitted by the default ISP policy for line 306. In some embodiments, this increase is only performed after receiving permission from router 102. ISP 302 continues to monitor traffic rates after an increase and resets the download speed to the default speed once the amount of data being downloaded no longer approaches or exceeds the default speed.

In some embodiments, router 102 monitors the amount of data being uploaded as well as the amount of data being uploaded over line 306. When data is being uploaded to ISP 302 at a speed that approaches the maximum upload speed set by ISP 302, router 102 sends a request to ISP 302 to temporarily increase the maximum upload speed set by ISP 302. For example, in some embodiments when data is being uploaded to ISP 302 from router 102 at speeds that approach 65 percent, 70 percent, 75 percent, 80 percent, 85 percent, or 90 percent of the maximum upload speed, router 102 will send a request to ISP 302 to increase the upload speed. In one user case scenario, consider the case where the maximum upload speed set by ISP 302 for router 102 is 1.5 Mbits/sec and that data is being uploaded to the ISP 302 from the router 102 at 1.3 Mbits/sec. Since the rate of 1.3 Mbits/sec approaches the maximum rate set by ISP 302, router 102 sends a request to ISP 302 to temporarily increase the maximum upload speed for line 306 to 3 Mbits/sec. Router 102 continues to monitor upload rates and can make additional requests to ISP 302 to increase the maximum upload speed as needed. Moreover, when router 102 is no longer sending data to ISP 302 at rates that approach the maximum upload speed set by ISP 302, router 102 can make a request to ISP 304 to restore the maximum upload speed to router 102 to the default speed. This procedure is advantageous because it is performed without the need for intervention from an end-point 104B user or the router 102 administrator.

In some embodiments, ISP 302 rather than router 102 monitors the amount of data being sent to ISP 302 over line 306 and automatically increases the maximum upload speed to ISP 302 when the amount of data being sent to ISP 302 approaches the maximum upload speed permitted by the default ISP policy for line 306. In some embodiments, this increase is only performed after receiving permission from router 102. ISP 302 continues to monitor traffic rates after an increase and resets the upload speed to the default speed once the amount of data being uploaded no longer approaches or exceeds the default speed.

It will be appreciated that upload speeds and download speeds have been described as separate embodiments. In fact, in typical embodiments, both upload and download speeds are monitored by router 102 and/or ISP 302 and the maximum rates for upload and download speeds are adjusted when needed in the manner described above.

In some embodiments, step 224 comprises evaluating router 102 load and performing the step of (i) dropping one or more connection tracks 38 based upon a respective value of a QoS parameter 42 associated with each of the one or more connection tracks 38 when the router load exceeds a threshold value and/or (ii) changing the value of each of the QoS parameters thereby reducing traffic through the router 102 and/or (iii) temporarily changing the line 306 upload speed and/or download speed.

In some embodiments, a QoS parameter associated with a connection track is a queue requirement and step 224 comprises evaluating queue status and performing the step of (i) dropping one or more connection tracks from the router when the queue status does not satisfy the first value of the queue requirement and/or (ii) changing the value of the queue requirement thereby reducing traffic through the router and/or (iii) adjusting the maximum upload rate and/or download rate between the router and an Internet Service Provider.

In some embodiments, a QoS parameter associated with a connection track is a router path requirement and step 224 comprises evaluating router path status of a first router path specified by the router path requirement and performing the step of (i) dropping one or more connection tracks from the router when the first router path in the router specified by the router path requirement has insufficient bandwidth for a connection track, and/or (ii) changing a value of a QoS parameter for each of one or more connection tracks thereby reducing traffic through the first router path specified by the router path requirement when the first router path has insufficient bandwidth and/or (iii) adjusting the maximum upload rate and/or download rate between the router and an Internet Service Provider.

Step 226. In step 226, the connection track data structure 38 is removed from the lookup table 34 when the associated connection track has been routed through network switch 16 to the appropriate endpoint 104.

The present invention can be implemented as a computer program product that comprises a computer program mechanism embedded in a computer readable storage medium. Further, any of the methods of the present invention can be implemented in one or more computers or computer systems. Further still, any of the methods of the present invention can be implemented in one or more computer program products. Some embodiments of the present invention provide a computer system or a computer program product that encodes or has instructions for performing any or all of the methods disclosed herein. Such methods/instructions can be stored on a CD-ROM, DVD, magnetic disk storage product, or any other computer readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

Some embodiments of the present invention provide a computer program product that contains any or all of the program modules or method steps shown in FIGS. 1 and/or 2. These program modules can be stored on a CD-ROM, DVD, magnetic disk storage product, or any other computer readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave. It will be appreciated that the application modules and data structures disclosed in FIG. 1 are for the purpose of describing aspects of the present disclosure. In fact, the modules and data structures disclosed in FIG. 1 can be merged into one or more modules and distributed for execution on one or more devices that are in electronic communication with each other.

What is claimed:

1. A routing method, comprising:
   (A) monitoring a current upload rate or a current download rate between (i) a router servicing one or more endpoints and (ii) an Internet Service Provider (ISP) that is in electronic communication with the router; and
   (B) comparing said upload rate or said download rate to a maximum upload rate or a maximum download rate between the router and the ISP imposed by the ISP, and increasing the maximum upload rate or the maximum download rate between said router and said ISP, without user or administrator intervention, when said current upload rate or said current download rate is above a first threshold amount.

2. The routing method of claim 1, the method further comprising:
   (C) monitoring a current upload rate or a current download rate between the router and the ISP after the maximum upload rate or the maximum download rate has been increased in step (B) and
   decreasing the maximum upload rate or the maximum download rate between said router and said ISP, without user or administrator intervention, when said current upload rate or said current download rate is below a second threshold amount.

3. The routing method of claim 2, wherein said current upload rate or said current download rate is below the second threshold amount when said current upload rate or said current download rate is eighty percent or less than the maximum upload rate or the maximum download rate set in step (B).

4. The routing method of claim 2, wherein said current upload rate or said current download rate is below the second threshold amount when said current upload rate or said current download rate is fifty percent or less than the maximum upload rate or the maximum download rate set in step (B).

5. The routing method of claim 2, wherein said current upload rate or said current download rate is below the second threshold amount when said current upload rate or said current download rate is forty percent or less than the maximum upload rate or the maximum download rate set in step (B).

6. The routing method of claim 1, wherein both the current upload rate and the current download rate are monitored in step (A) and both the maximum upload rate and the maximum download rate are increased in step (B).

7. The routing method of claim 1, wherein just the current upload rate is monitored in step (A) and just the maximum upload rate is increased in step (B).

8. The routing method of claim 1, wherein just the current download rate is monitored in step (A) and just the maximum download rate is increased in step (B).

9. The routing method of claim 1, wherein said current upload rate or said current download rate is above the first threshold amount when said current upload rate or said current download rate is seventy percent or greater of the maximum upload rate or the maximum download rate.

10. The routing method of claim 1, wherein said current upload rate or said current download rate is above the first threshold amount when said current upload rate or said current download rate is eighty percent or greater of the maximum upload rate or the maximum download rate.

11. The routing method of claim 1, wherein said current upload rate or said current download rate is above the first threshold amount when said current upload rate or said current download rate is ninety percent or greater of the maximum upload rate or the maximum download rate.

12. The routing method of claim 1, wherein the monitoring step (A) is performed by the router and the comparing step (B) further comprises requesting the ISP to increase the maximum upload rate or the maximum download rate between the router and the ISP when said current upload rate or said current download rate is above the first threshold amount.

13. The routing method of claim 1, wherein the monitoring step (A) is performed by the ISP.

14. The routing method of claim 13, wherein the comparing step (B) further comprises requesting permission from the router to increase the maximum upload rate or the maximum download rate between the router and the ISP when said current upload rate or said current download rate is above the first threshold amount.

15. An apparatus for routing data packets, the apparatus comprising a router, the router comprising:
   a processor; and
   a memory, coupled to the processor, the memory storing instructions for execution by said processor, said instructions comprising instructions for:
   (A) monitoring a current upload rate or a current download rate between (i) the apparatus and (ii) an Internet Service Provider (ISP) that is in electronic communication with the apparatus; and
   (B) comparing said upload rate or said download rate to a maximum upload rate or download rate imposed by the ISP, and
   increasing the maximum upload rate or the maximum download rate, without user or administrator intervention, when said current upload rate or said current download rate is above a first threshold amount.

16. A non-transitory computer-readable medium storing one or more computer programs executable by a computer to perform a routing method comprising:
   (A) monitoring a current upload rate or a current download rate between (i) a router servicing one or more endpoints and (ii) an Internet Service Provider (ISP) that is in electronic communication with the router; and
   (B) comparing said upload rate or said download rate to a maximum upload rate or a maximum download rate imposed by the ISP, and
   increasing the maximum upload rate or the maximum download rate, without user or administrator intervention, when said current upload rate or said current download rate is above a first threshold amount.

\* \* \* \* \*